United States Patent
Liu et al.

(10) Patent No.: US 9,201,780 B2
(45) Date of Patent: Dec. 1, 2015

(54) METHOD AND DEVICE FOR ADJUSTING MEMORY OF VIRTUAL MACHINE

(71) Applicant: Huawei Technologies Co., Ltd., Shenzhen, Guangdong (CN)

(72) Inventors: Jintao Liu, Xi'an (CN); Houqing Li, Xi'an (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 177 days.

(21) Appl. No.: 14/024,308

(22) Filed: Sep. 11, 2013

(65) Prior Publication Data

US 2014/0013072 A1 Jan. 9, 2014

Related U.S. Application Data

(63) Continuation of application No. PCT/CN2011/083036, filed on Nov. 28, 2011.

(51) Int. Cl.
*G06F 12/02* (2006.01)
*G06F 9/50* (2006.01)
*G06F 9/455* (2006.01)

(52) U.S. Cl.
CPC .............. *G06F 12/02* (2013.01); *G06F 9/5016* (2013.01); *G06F 9/5077* (2013.01); *G06F 9/45558* (2013.01); *G06F 2009/45583* (2013.01)

(58) Field of Classification Search
CPC . G06F 9/5016; G06F 9/5077; G06F 9/45558; G06F 2009/45583
See application file for complete search history.

(56) References Cited

U.S. PATENT DOCUMENTS

| 7,702,843 B1* | 4/2010 | Chen et al. ......................... 711/6 |
| 2005/0262324 A1* | 11/2005 | Mathiske ...................... 711/170 |
| 2005/0262505 A1* | 11/2005 | Esfahany et al. .................. 718/1 |
| 2006/0069761 A1 | 3/2006 | Singh et al. |
| 2008/0172499 A1* | 7/2008 | Moriki et al. .................... 710/22 |
| 2009/0265707 A1 | 10/2009 | Goodman et al. |
| 2010/0077128 A1 | 3/2010 | Stansell et al. |
| 2010/0169536 A1* | 7/2010 | Shedel et al. ...................... 711/6 |
| 2011/0153928 A1* | 6/2011 | Avudaiyappan et al. ..... 711/109 |
| 2012/0221765 A1* | 8/2012 | Yoo et al. .......................... 711/6 |

FOREIGN PATENT DOCUMENTS

CN 101504620 A 8/2009
CN 102156665 A 8/2011

OTHER PUBLICATIONS

International Search Report in corresponding PCT Patent Application No. PCT/CN2011/083036 (Sep. 6, 2012).

* cited by examiner

*Primary Examiner* — Ryan Bertram
(74) *Attorney, Agent, or Firm* — Leydig, Voit & Mayer, Ltd.

(57) ABSTRACT

The present invention relates to a method and a device for adjusting memory of a virtual machine. The method includes: checking memory usages of virtual machines according to a preset memory usage threshold to determine multiple virtual machines whose memory is to be adjusted; determining, according to parameters preselected by the multiple virtual machines whose memory is to be adjusted, priority levels of the virtual machines whose memory is to be adjusted; and adjusting, according to the priority levels of the virtual machines whose memory is to be adjusted, memory of the virtual machines whose memory is to be adjusted. According to embodiments of the present invention, memory of a virtual machine on which a key application or service is deployed is adjusted in time and prevents a process of a priority service from being affected due to delayed memory adjustment.

6 Claims, 5 Drawing Sheets

METHOD AND DEVICE FOR ADJUSTING MEMORY OF VIRTUAL MACHINE

CROSS-REFERENCE TO RELATED APPLICATIONS

This application is a continuation of International Patent Application No. PCT/CN2011/083036, filed on Nov. 28, 2011, which is hereby incorporated by reference in its entirety.

TECHNICAL FIELD

The present invention relates to the field of virtual machines, and in particular, to a method and a device for adjusting memory of a virtual machine.

BACKGROUND

Currently, memory overcommitment (on-demand allocation) is implemented for memory management of a virtual machine in the industry. That is, a certain proportion of memory (for example, 1 GB) is first allocated, according to a certain proportion, to the virtual machine according to a memory specification (for example, 2 GB) of the virtual machine, and then dynamic adjustment (for example, 1.5 GB or 2 GB) is performed according to the memory that is being used when the virtual machine is running and the physical memory is allocated to the virtual machine on demand. The specification of the virtual machine is reached at utmost. However, in a situation in which the actual physical memory resources are in short supply, different virtual machines have the same capability of allocating the memory, and differentiated treatment cannot be provided for users with different requirements in the use of the memory resources.

In an existing technical solution, a memory monitor thread of a virtual machine monitors memory use of the virtual machine in real time; when detecting that the memory usage of the virtual machine keeps surging in specified time, the memory monitor thread adjusts the memory of the virtual machine to prevent application collapse caused by exhaustion of the memory of the virtual machine. The solution implements flexible management of memory resources, so that a specification and a capacity of a cloud computing system can be improved.

In the existing solution, when the memory of a batch of virtual machines keeps surging, all virtual machines are treated in the same way. As a result, a timely response may not be received for a virtual machine adjustment request for deploying a key application or service, and therefore an entire service process is affected.

SUMMARY

An objective of embodiments of the present invention is to provide a method for adjusting memory of a virtual machine. A priority level of each virtual machine for memory adjustment is determined according to factors such as a memory adjustment urgency degree, a service priority level, and a user priority level of the virtual machine. Memory of a virtual machine with a high priority level is adjusted first, so as to ensure normal running of a priority service and avoid a service risk.

In one aspect, a method for adjusting memory of a virtual machine is provided. The method includes:

checking memory usages of virtual machines according to a preset memory usage threshold to determine multiple virtual machines whose memory is to be adjusted;

determining, according to parameters preselected by the multiple virtual machines whose memory is to be adjusted, priority levels of the virtual machines whose memory is to be adjusted; and adjusting, according to the priority levels of the virtual machines whose memory is to be adjusted, memory of the virtual machines whose memory is to be adjusted.

In another aspect, a device for adjusting memory of a virtual machine is provided. The device includes:

a monitoring unit, configured to check memory usages of virtual machines according to a preset memory usage threshold to determine multiple virtual machines whose memory is to be adjusted;

a processing unit, configured to determine, according to parameters preselected by the multiple virtual machines whose memory is to be adjusted, priority levels of the virtual machines whose memory is to be adjusted; and an adjusting unit, configured to adjust, according to the priority levels of the virtual machines whose memory is to be adjusted, memory of the virtual machines whose memory is to be adjusted.

According to the embodiment of the present invention, memory of a virtual machine is adjusted according to a priority level of a memory adjustment requirement of the virtual machine, which ensures that memory of a virtual machine on which a key application or service is deployed is adjusted in time and prevents a process of a priority service from being affected due to delayed memory adjustment.

BRIEF DESCRIPTION OF DRAWINGS

To illustrate the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DESCRIPTION OF EMBODIMENTS

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
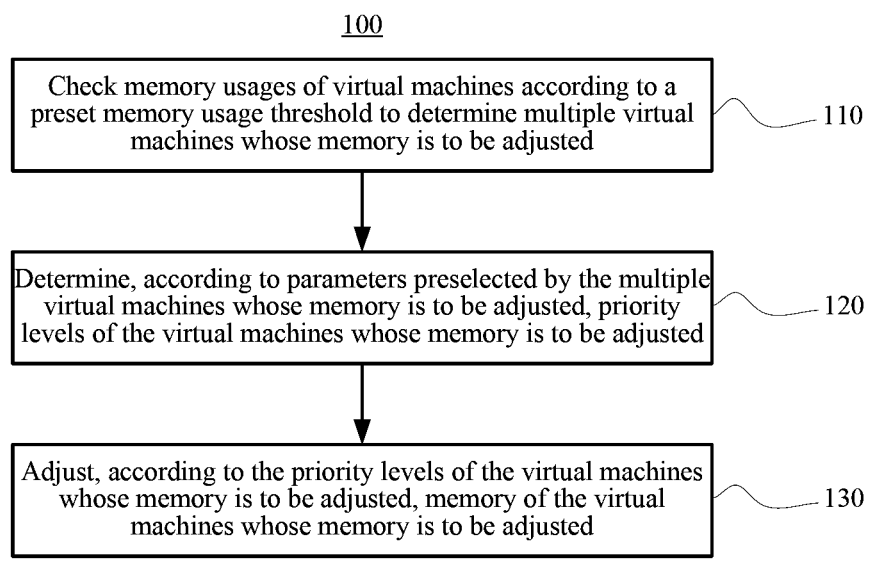
FIG. 1 is a flowchart of a method for adjusting memory of a virtual machine according to an embodiment of the present invention.

FIG. 1 is a schematic flowchart of a method for adjusting memory of a virtual machine according to an embodiment of the present invention. As shown in FIG. 1, a method 100 for adjusting memory of a virtual machine includes:

110: Check memory usages of virtual machines according to a preset memory usage threshold to determine multiple virtual machines whose memory is to be adjusted;

120: Determine, according to parameters preselected by the multiple virtual machines whose memory is to be adjusted, priority levels of the virtual machines whose memory is to be adjusted; and 130: Adjust, according to the priority levels of the virtual machines whose memory is to be adjusted, memory of the virtual machines whose memory is to be adjusted.

The following describes in detail a specific implementation process of the method for adjusting memory of a virtual machine according to the embodiment of the present invention with reference to the accompanying drawings.

First, for the step 110 of the method 100 for adjusting memory of a virtual machine, virtual machines whose memory usages keep exceeding the preset memory usage threshold in a certain time period are identified, by keeping monitoring memory use of each virtual machine, as virtual machines whose memory is to be adjusted.

According to an embodiment of the present invention, for example, a virtual machine whose memory is to be adjusted is determined through the following process.

Figure 2:
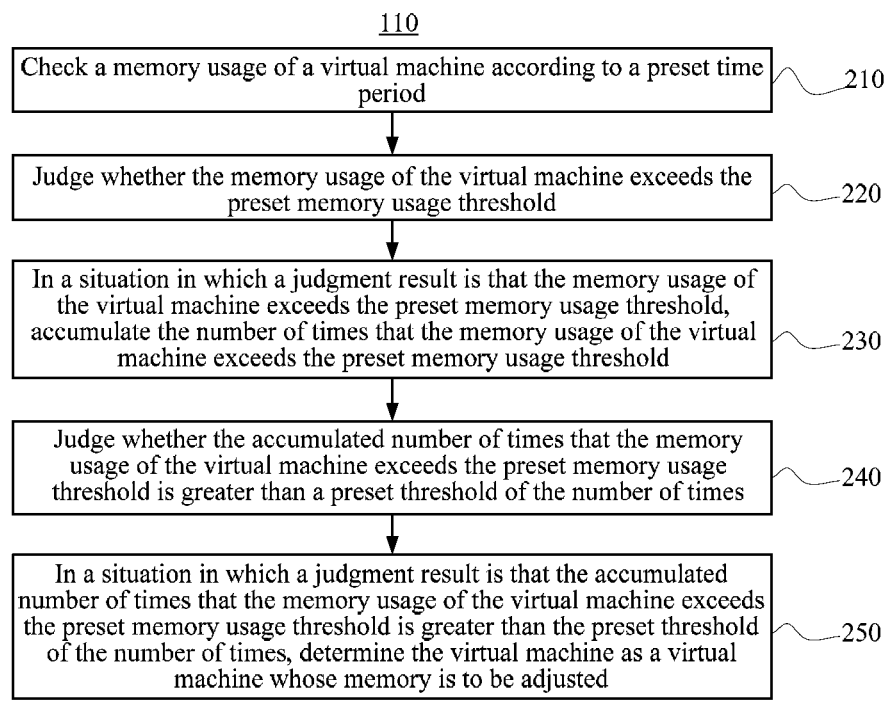
FIG. 2 is a specific flowchart of a step of determining a virtual machine whose memory is to be adjusted in a method for adjusting memory of a virtual machine according to an embodiment of the present invention.

FIG. 2 is an exemplary flowchart for determining a virtual machine whose memory is to be adjusted according to an embodiment of the present invention. As shown in FIG. 2, the step 110 of checking memory usages of virtual machines according to a preset memory usage threshold to determine multiple virtual machines whose memory is to be adjusted includes:

210: Check a memory usage of a virtual machine according to a preset time period, for example, five seconds.

220: Judge whether the memory usage of the virtual machine exceeds the preset memory usage threshold, for example, 70%.

230: In a situation in which a judgment result is that the memory usage of the virtual machine exceeds the preset memory usage threshold, accumulate the number of times that the memory usage of the virtual machine exceeds the preset memory usage threshold.

According to the embodiment of the present invention, the number of times that the memory usage of the virtual machine exceeds the preset memory usage threshold may be simply accumulated by using a counter.

240: Judge whether the accumulated number of times that the memory usage of the virtual machine exceeds the preset memory usage threshold is greater than a preset threshold of the number of times. For example, judge whether the counter reaches a preset upper limit, where the upper limit is the threshold of the number of times.

250: In a situation in which a judgment result is that the accumulated number of times that the memory usage of the virtual machine exceeds the preset memory usage threshold is greater than the preset threshold of the number of times, determine the virtual machine as a virtual machine whose memory is to be adjusted.

According to the foregoing embodiment of the present invention, when the number of times that a memory usage of a virtual machine exceeds a preset memory usage threshold exceeds a preset threshold of the number of times, the virtual machine is determined as a virtual machine whose memory is to be adjusted.

According to another exemplary embodiment of the present invention, when the number of consecutive times that a memory usage of a virtual machine exceeds the preset memory usage threshold exceeds the preset threshold of the number of times, the virtual machine may be determined as a virtual machine whose memory is to be adjusted.

Figure 3:
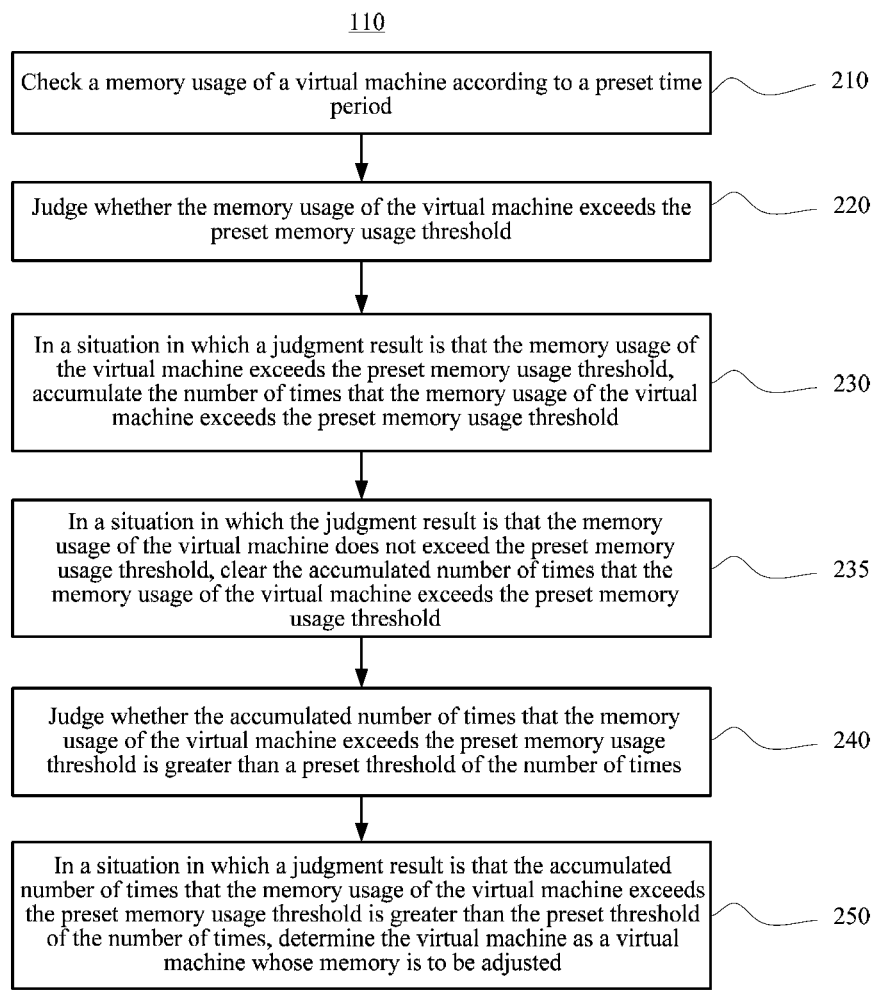
FIG. 3 is a further specific flowchart of a step of determining a virtual machine whose memory is to be adjusted in a method for adjusting memory of a virtual machine according to an embodiment of the present invention.

In this situation, as shown in FIG. 3, the step of determining a virtual machine whose memory is to be adjusted further includes the following step:

235: In a situation in which the judgment result is that the memory usage of the virtual machine does not exceed the preset memory usage threshold, clear the accumulated number of times that the memory usage of the virtual machine exceeds the preset memory usage threshold.

In this situation, when the number of consecutive times that a memory usage of a virtual machine exceeds a preset memory usage threshold exceeds a preset threshold of the number of times, the virtual machine is determined as a virtual machine whose memory is to be adjusted, and an urgency degree of memory adjustment required by the virtual machine is more accurately reflected.

Figure 4:
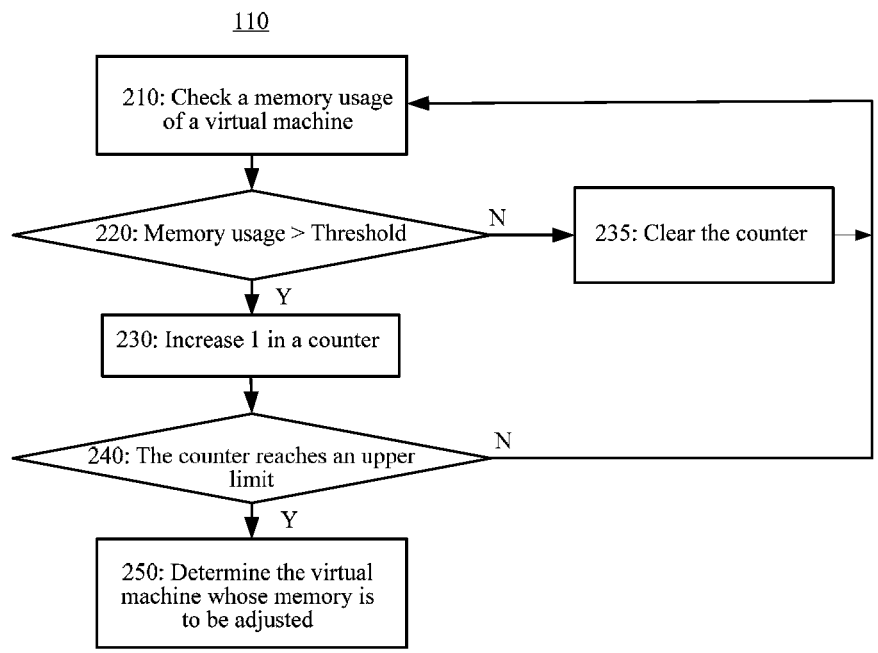
FIG. 4 is a schematic block diagram that indicates the flowchart shown in FIG. 3.

FIG. 4 is a flow block diagram of the step of determining a virtual machine whose memory is to be adjusted, and the flow block diagram corresponds to the flowchart shown in FIG. 3.

In the method for adjusting memory of a virtual machine according to the embodiment of the present invention, for the step 120 of determining, according to parameters preselected by the multiple virtual machines whose memory is to be adjusted, priority levels of the virtual machines whose memory is to be adjusted, the priority levels of the virtual machines whose memory is to be adjusted may be determined by comprehensively considering one or more preselected parameters. Generally, the parameters may include a memory usage, a user priority level, and a service priority level of a virtual machine. A person skilled in the art may select one or more parameters from these parameters according to a specific situation to determine a priority level of a virtual machine whose memory is to be adjusted.

According to the embodiment of the present invention, for example, all the three parameters, that is, the memory usage, user priority level, and the service priority level of the virtual machine, are used to determine the priority level of the virtual machine whose memory is to be adjusted. For example, for the memory usage, the user priority level, and the service priority level, a weight of each parameter is preset separately, and a weighted sum of the memory usage, the user priority level, and the service priority level is calculated as the priority level of the virtual machine whose memory is to be adjusted.

For example, if a weight of the memory usage is 50%, a weight of the user priority level is 30%, and a weight of the service priority level is 20%, then:

priority level of the virtual machine whose memory is to be adjusted=memory usage*50%+user priority level*30%+service priority level*20%.

According to the embodiment of the present invention, a person skilled in the art may understand that for a specific application scenario, the number of parameters that are used to calculate a priority level of a virtual machine whose memory is to be adjusted and a weight of each parameter may be changed to meet different requirements.

Generally, in a computer system including a virtual machine, computing resource manager (Computation Resources Manager, CRM for short) periodically sends a message for refreshing the virtual machine to a computing node (Computing Node, CNA for short), and the CNA returns information about the virtual machine to the CRM, where the returned message includes a memory usage of the virtual machine and the memory usage reflects a memory adjustment urgency degree of the virtual machine. The higher the memory usage is, the higher the memory adjustment urgency degree of the virtual machine is, and the higher a calculated priority is.

A CRM node periodically refreshes information about a virtual machine, and there will be a certain delay, which may cause memory of a virtual machine whose memory usage keeps rising to fail to be adjusted in time. According to an optional embodiment of the present invention, a CNA may be used to actively report memory usage information, and a memory usage obtained by the CRM may be used, in the step 110 of the method for adjusting memory of a virtual machine according to the embodiment of the present invention, to determine whether the virtual machine is a virtual machine whose memory is to be adjusted and may be used in the step 120 to determine a priority level of a virtual machine whose memory is to be adjusted.

According to a specific example, calculating, according to the parameters of the virtual machine whose memory is to be adjusted and a preset weight of each parameter, a weighted sum of the parameters as a priority level of the virtual machine whose memory is to be adjusted includes:
  acquiring a memory usage, a user priority level, and a service priority level of the virtual machine whose memory is to be adjusted; and
  calculating, according to the memory usage, the user priority level, and the service priority level of the virtual machine whose memory is to be adjusted and weights corresponding to the memory usage, the user priority level, and the service priority level, a weighted sum of the memory usage, the user priority level, and the service priority level of the virtual machine whose memory is to be adjusted as the priority level of the virtual machine whose memory is to be adjusted.

In the method 100 for adjusting memory of a virtual machine according to the embodiment of the present invention, the step 130 of adjusting, according to the priority levels of the virtual machines whose memory is to be adjusted, memory of the virtual machines whose memory is to be adjusted may include:
  dividing, according to a range that is preset for the priority levels of the virtual machines whose memory is to be adjusted, the virtual machines whose memory is to be adjusted into multiple different adjustment queues; and
  successively adjusting, according to descending priority levels of the multiple adjustment queues, memory of the virtual machines whose memory is to be adjusted in the multiple adjustment queues in a single-thread working mode.

According to the embodiment of the present invention, after priority levels of virtual machines whose memory is to be adjusted are determined, for example, the virtual machines whose memory is to be adjusted may be divided, according to a range set for the priority levels of the virtual machines whose memory is to be adjusted, into three adjustment queues with high, medium, and low priority levels. A person skilled in the art may understand that according to a specific application scenario, virtual machines whose memory is to be adjusted may be divided, according to different ranges, into different adjustment queues with different priority levels, for example, be divided into a first, a second, a third, and a fourth adjustment queues according to descending priority levels.

According to the embodiment of the present invention, when a system on which virtual machines are located uses the single-thread working mode, memory of the virtual machines whose memory is to be adjusted in the adjustment queues with the high, medium, and low priority levels may be successively processed according to the priority levels of the adjustment queues, for example, according to the descending priority levels.

Definitely, when the system on which the virtual machines are located uses a multi-thread working mode, multiple adjustment threads corresponding to the multiple adjustment queues may be set, and corresponding priority levels may be granted to the multiple adjustment threads, for example, the priority levels of the adjustment threads are high, medium, and low. In this case, the multiple adjustment threads adjust in parallel, according to the priority levels of the multiple adjustment threads, memory of the virtual machines whose memory is to be adjusted in the multiple adjustment queues.

According to the embodiment of the present invention, memory of a virtual machine is adjusted according to a priority level of a memory adjustment requirement of the virtual machine, which ensures that memory of a virtual machine on which a key application or service is deployed is adjusted in time and prevents a process of a priority service from being affected due to delayed memory adjustment.

An embodiment of the present invention further provides a device for adjusting memory of a virtual machine, and the device may be configured to implement the method for adjusting memory of a virtual machine according to the embodiment of the present invention.

Figure 5:
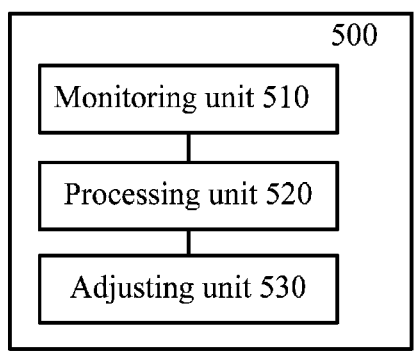
FIG. 5 is a schematic structural diagram of a device for adjusting memory of a virtual machine according to an embodiment of the present invention.

FIG. 5 is a schematic structural diagram of a device 500 for adjusting memory of a virtual machine according to an embodiment of the present invention. As shown in FIG. 5, the device 500 for adjusting memory of a virtual machine includes:
  a monitoring unit 510, configured to check memory usages of virtual machines according to a preset memory usage threshold to determine multiple virtual machines whose memory is to be adjusted;
  a processing unit 520, configured to determine, according to parameters preselected by the multiple virtual machines whose memory is to be adjusted, priority levels of the virtual machines whose memory is to be adjusted; and
  an adjusting unit 530, configured to adjust, according to the priority levels of the virtual machines whose memory is to be adjusted, memory of the virtual machines whose memory is to be adjusted.

Figure 6:
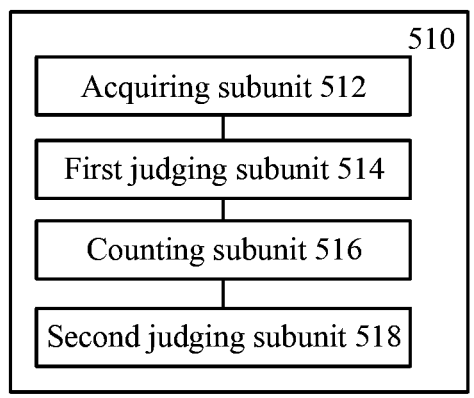
FIG. 6 is a specific block diagram of a monitoring unit in a device for adjusting memory of a virtual machine according to an embodiment of the present invention.

According to the embodiment of the present invention, as shown in FIG. 6, the monitoring unit 510 of the device 500 may specifically include:

an acquiring subunit 512, configured to check a memory usage of a virtual machine according to a preset time period;

a first judging subunit 514, configured to judge whether the memory usage of the virtual machine exceeds the preset memory usage threshold;

a counting subunit 516, configured to accumulate, in a situation in which a judgment result of the first judging subunit 514 is that the memory usage of the virtual machine exceeds the preset memory usage threshold, the number of times that the memory usage of the virtual machine exceeds the preset memory usage threshold; and a second judging subunit 518, configured to judge whether the accumulated number of times that the memory usage of the virtual machine exceeds the preset memory usage threshold is greater than a preset threshold of the number of times, where in a situation in which a judgment result of the second judging subunit 518 is that the accumulated number of times that the memory usage of the virtual machine exceeds the preset memory usage threshold is greater than the preset threshold of the number of times, the monitoring unit 510 determines the virtual machine as a virtual machine whose memory is to be adjusted.

According to the embodiment of the present invention, in a situation in which a judgment result of the first judging subunit 514 is that the memory usage of the virtual machine does not exceed the preset memory usage threshold, the monitoring unit 510 is configured to clear the accumulated number of times that the memory usage of the virtual machine exceeds the preset memory usage threshold.

According to the embodiment of the present invention, the processing unit 520 is configured to calculate, according to the parameters of the virtual machine whose memory is to be adjusted and a preset weight of each parameter, a weighted sum of the parameters as a priority level of the virtual machine whose memory is to be adjusted, where the parameters include at least one of a memory usage, a user priority level, and a service priority level.

Figure 7:
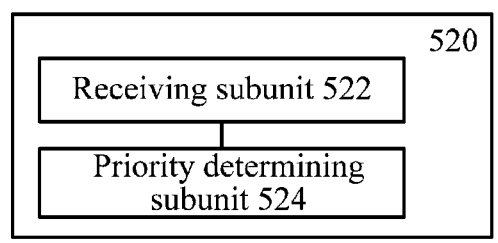
FIG. 7 is a specific block diagram of a processing unit in a device for adjusting memory of a virtual machine according to an embodiment of the present invention.

As shown in FIG. 7, according to an embodiment of the present invention, the processing unit 520 may specifically include:

a receiving subunit 522, configured to acquire a memory usage, a user priority level, and a service priority level of the virtual machine whose memory is to be adjusted; and a priority determining subunit 524, configured to calculate, according to the memory usage, the user priority level, and the service priority level of the virtual machine whose memory is to be adjusted that are acquired by the receiving subunit 522 and weights corresponding to the memory usage, the user priority level, and the service priority level, a weighted sum of the memory usage, the user priority level, and the service priority level of the virtual machine whose memory is to be adjusted as a priority level of the virtual machine whose memory is to be adjusted.

Figure 8:
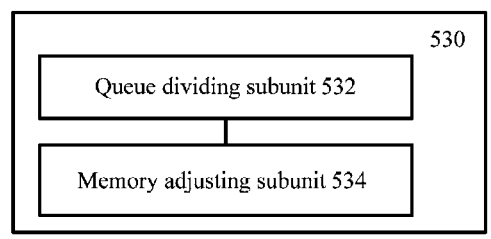
FIG. 8 is a specific block diagram of an adjusting unit in a device for adjusting memory of a virtual machine according to an embodiment of the present invention.

As shown in FIG. 8, according to an embodiment of the present invention, the adjusting unit 530 may specifically include:

a queue dividing subunit 532, configured to divide, according to a range that is preset for the priority levels of the virtual machines whose memory is to be adjusted, the virtual machines whose memory is to be adjusted into multiple different adjustment queues; and a memory adjusting subunit 534, configured to successively adjust, according to descending priority levels of the multiple adjustment queues, memory of the virtual machines whose memory is to be adjusted in the multiple adjustment queues in a single-thread working mode.

According to the embodiment of the present invention, in a multi-thread working mode, the memory adjusting subunit 534 is configured to set multiple adjustment threads corresponding to the multiple adjustment queues and grant corresponding priority levels to the multiple adjustment threads, where the multiple adjustment threads adjust in parallel, according to the priority levels of the multiple adjustment threads, memory of the virtual machines whose memory is to be adjusted in the multiple adjustment queues.

A person skilled in the art may understand that the device for adjusting memory of a virtual machine according to the embodiment of the present invention may be implemented as a device, such as a personal computer, a workstation, or a network server, on which a virtual machine is running, and a specific manner of implementing the device for adjusting memory of a virtual machine is not limited in the embodiment of the present invention.

A person of ordinary skill in the art may be aware that, in combination with the examples described in the embodiments that are disclosed in this specification, units and algorithm steps can be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program code, such as a USB flash disk, a removable hard disk, a read-only memory (Read-Only Memory, ROM), a random access memory (Random Access Memory, RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for adjusting memory capacities of virtual machines by a server, comprising:
   obtaining memory usages of the virtual machines;
   selecting multiple target virtual machines from the virtual machines with memory usage exceeding a ratio more than N times, wherein N is an integer greater than 1;
   determining a priority level for each selected target virtual machine according to preset parameters of each target virtual machine; and
   adjusting memory capacity of each selected target virtual machine, according to the determined priority level of each target virtual machine.

2. The method according to claim 1, wherein the preset parameters of each target virtual machine includes at least a memory usage level, a user priority level and a service priority level.

3. The method according to claim 1, wherein the step of adjusting the memory capacity of each selected target virtual machine comprises:
   mapping the multiple target virtual machines with different adjusting queues according to the priority level of the each target virtual machine, wherein each adjusting queue corresponds to the priority level; and
   adjusting memory capacities of the multiple target virtual machines with the priority level of the each adjusting queue.

4. A storage system comprises a plurality of virtual machines and a server, wherein the server is configured to
   obtain memory usages of the virtual machines;
   select multiple target virtual machines from the virtual machines with memory usage exceeding a ratio more than N times, wherein N is an integer greater than 1;
   determine a priority level for each selected target virtual machine according to preset parameters of each target virtual machine; and
   adjust memory capacity of each selected target virtual machine, according to the determined priority level of the each target virtual machine.

5. The storage system according to claim 4, wherein the preset parameters of each target virtual machine includes at least a memory usage level, a user priority level, and a service priority level.

6. The storage system according to claim 4, wherein the server is configured to map the multiple target virtual machines with different adjusting queues according to the priority level of the each target virtual machine, wherein each adjusting queue corresponds to a priority level; and
   adjust memory capacities of the multiple target virtual machines with the priority level of the each adjusting queue.

* * * * *